United States Patent [19]
Rink et al.

[11] Patent Number: 5,897,421
[45] Date of Patent: Apr. 27, 1999

[54] ALPHA BEANIE BUDDIES

[76] Inventors: Donna M. Rink; Deborah M. Rink, both of 1013 D Lincolnshire Ct., Elgin, Ill. 60120

[21] Appl. No.: 09/065,310

[22] Filed: Apr. 23, 1998

[51] Int. Cl.[6] .............................. A63H 3/02; G09B 1/00
[52] U.S. Cl. ...................... 446/369; 446/901; 434/160; 434/403; 434/421
[58] Field of Search .................................. 446/369, 390, 446/491, 901; 434/159, 160, 171, 172, 403, 421; 40/594, 620

[56] References Cited

U.S. PATENT DOCUMENTS

| Re. 19,238 | 7/1934 | Burke | 446/901 X |
|---|---|---|---|
| 1,336,898 | 4/1920 | Flynn | 446/369 |
| 1,753,032 | 4/1930 | Stein et al. | 446/390 X |
| 3,789,547 | 2/1974 | Chemarin | 446/390 X |
| 4,427,390 | 1/1984 | Manger | 434/159 |
| 4,563,159 | 1/1986 | Hills et al. | 446/369 X |
| 5,188,533 | 2/1993 | Wood | 434/171 X |
| 5,232,392 | 8/1993 | Ortiz | 446/901 X |
| 5,581,922 | 12/1996 | Heimann | 434/172 X |

FOREIGN PATENT DOCUMENTS 357320  9/1931  United Kingdom ................... 434/172

OTHER PUBLICATIONS

Pillow Talk, Butterick Patterns Inc., Oct. 1979.
Alpha Critters, Playthings, p. 79, Apr. 3, 1986.

Primary Examiner—Robert A. Hafer
Assistant Examiner—D. Neal Muir
Attorney, Agent, or Firm—Meroni & Meroni

[57] ABSTRACT

A bean bag alphanumeric figure is provided comprised of a first fabric side and a second fabric side having indicia of a face on the exterior of the first fabric side. The first fabric side and the second fabric side are held together in attachment so as to form a pocket by stitching along the periphery of the fabric sides so as to expose the exterior of the first fabric side to the exterior of the pocket. The pocket formed from first fabric side and the second fabric side is stitched closed leaving an opening which would allow the filling of the pocket formed from the two sides with a bean or pellet like material. The two sides of the fabric left unattached would then be brought into engagement and attached by stitching the sides closed. A Velcro™ like material or snaps would be provided on both sides of the feet and hands of the alphanumeric figures so that they may be brought into removable engagement with each other removably secured hand to hand, foot to foot, or foot to hand. Additionally, in one embodiment, a mechanical sound producing device may be sew into the interior of the pocket which, upon activation by depression, produces a voice which says the name of the letter or number into which the mechanical sound producing device has been inserted. Furthermore, in one embodiment, a flexible rollable board having a Velcro™ like material or snaps along a front of the board, may be utilized by attaching the individual figures to the Velcro™ or snaps of the board to the Velcro™ or snaps of the hands and feet of the figures.

27 Claims, 6 Drawing Sheets

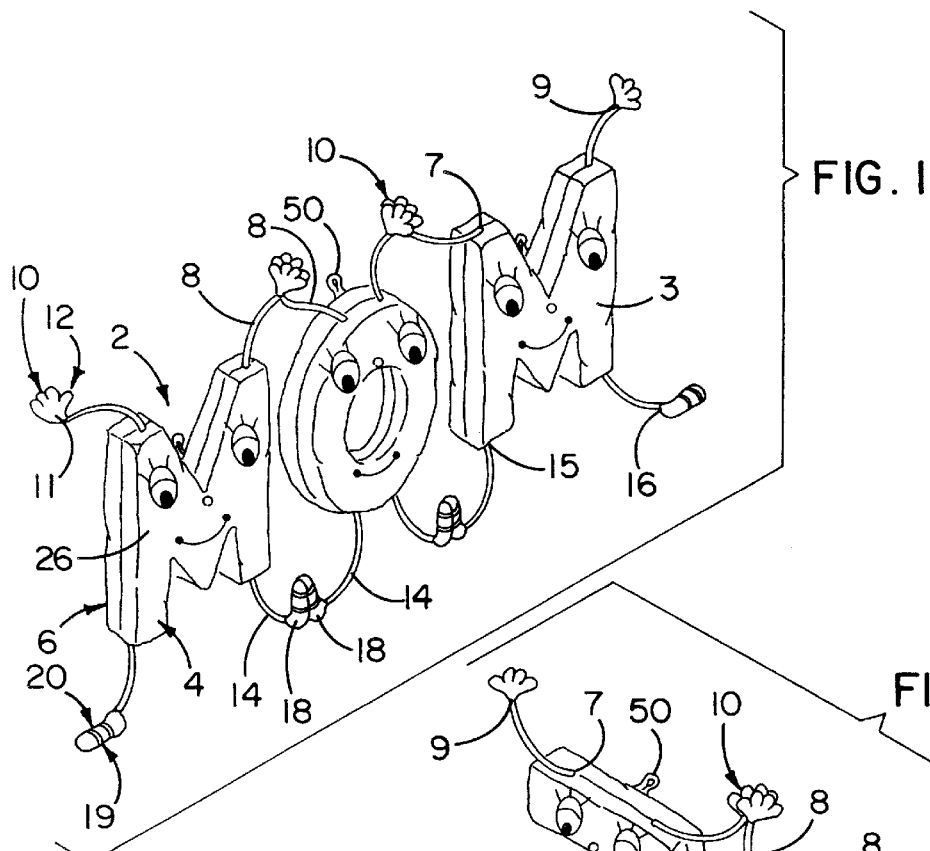
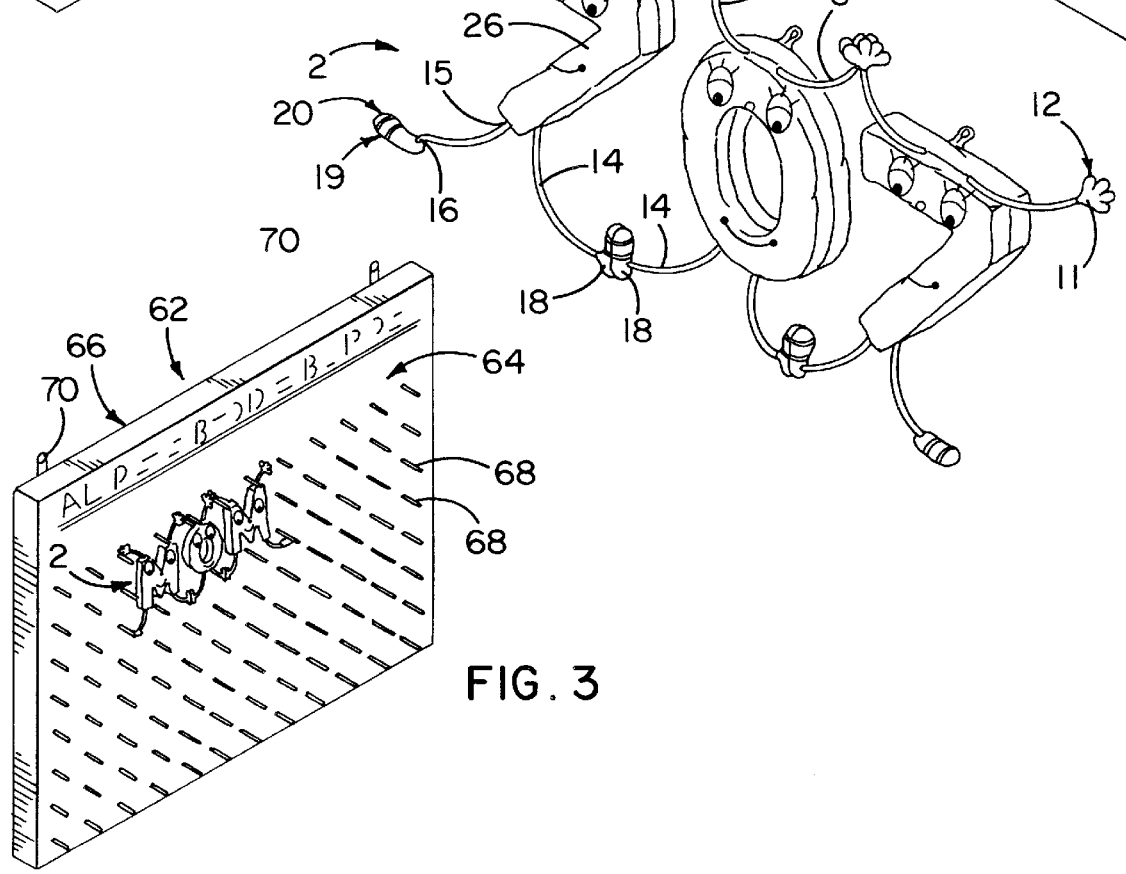

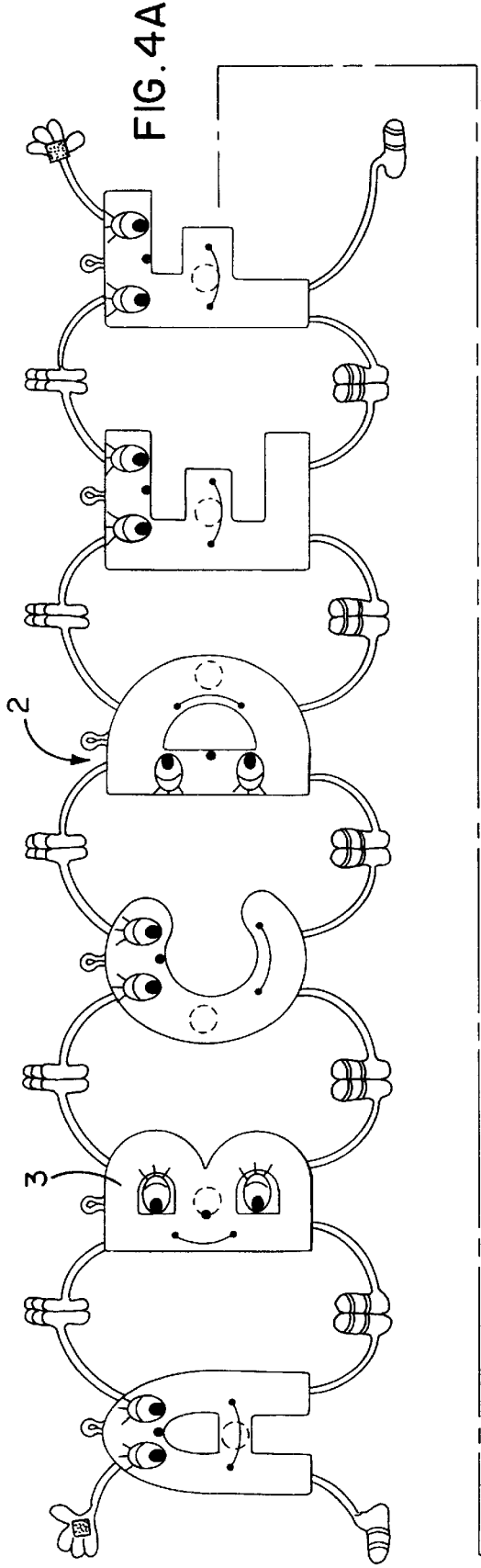
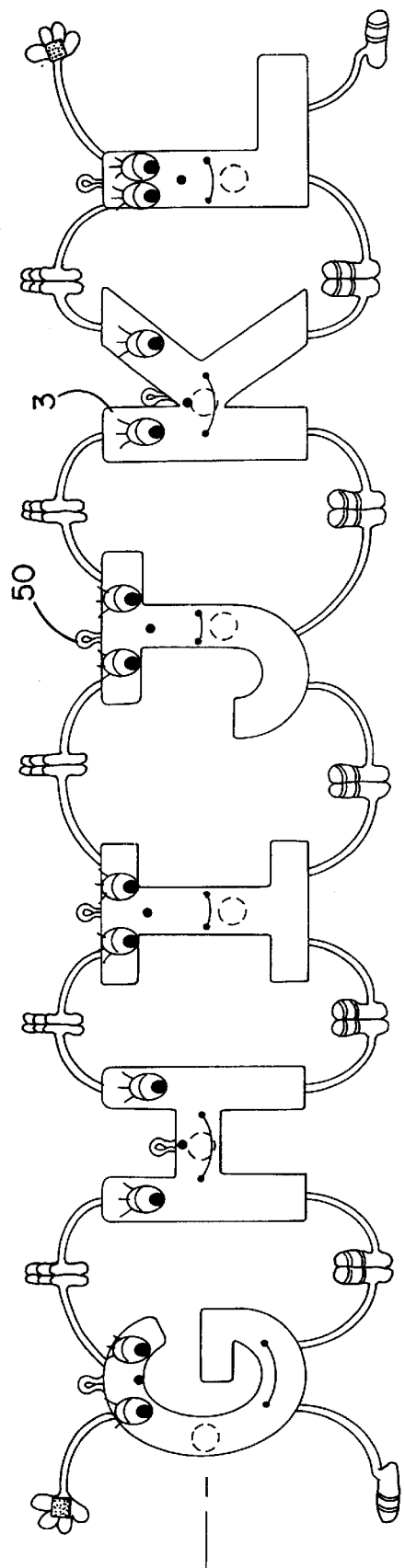
FIG. 4A

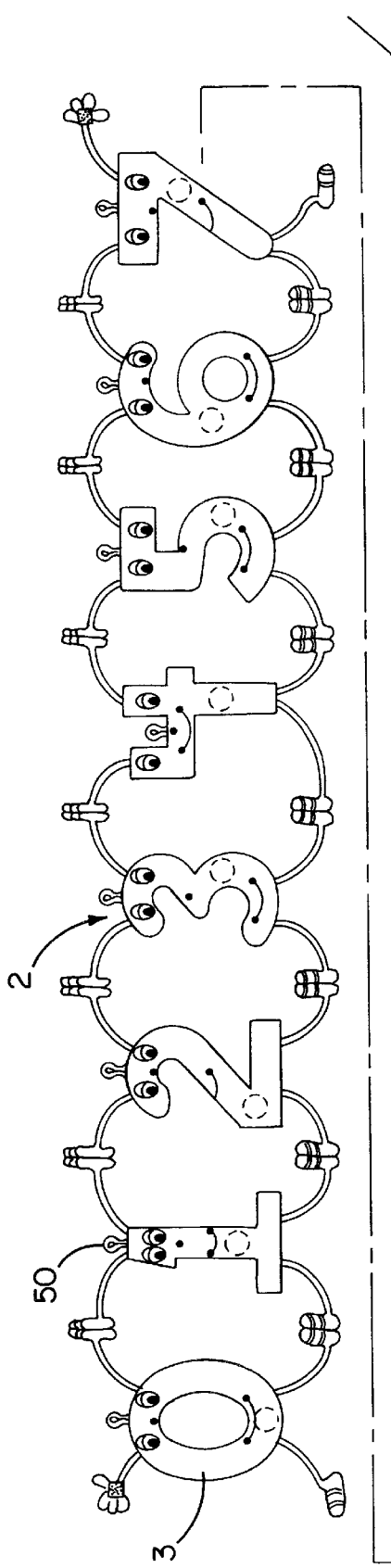
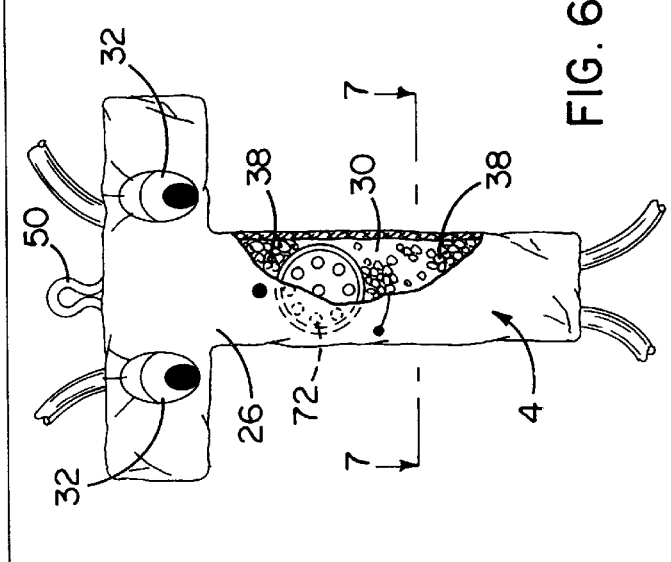
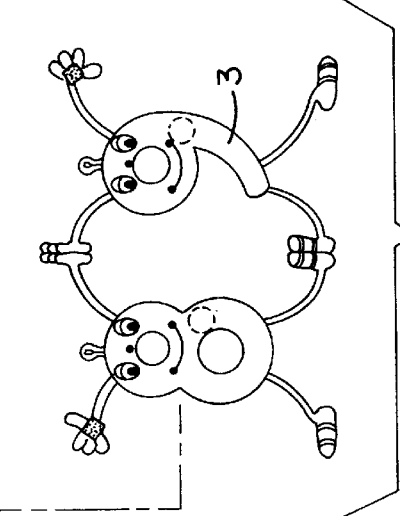
FIG. 5
FIG. 6

ALPHA BEANIE BUDDIES

BACKGROUND OF THE INVENTION

1. Field of the Invention

This invention relates in general to teaching and learning aids and, more particularly, to a unique learning toy for teaching the letters of the alphabet and reading and for teaching numbers and counting.

2. Discussion of the Prior Art

Since knowledge of the alphabet and numbers is critical to the development of reading and math skills, the creation of devices to assist in the teaching of the letters of the alphabet or numbers has always been of great interest.

Simple approaches, such as writing letters or numbers on a chalkboard have been in use in the art. However, many approaches to teaching letters or numbers lack a hands on quality that may be required to assist and promote interest and learning.

Certain hands on devices, such as cubes or blocks with letters on the various sides thereof, have been currently developed and utilized in teaching pre-school and kindergarten students. However, these devices lack the ability to be interconnected to spell out words or numbers and are not easily portable.

BRIEF SUMMARY OF THE INVENTION

Therefore, it is one object of this invention to provide an assembly of teaching figures to facilitate the teaching of reading and counting.

It is a further object of the invention to provide an assembly of teaching figures which are designed to aid in hands on learning situations.

In accordance with the present invention, an alphanumeric figure is provided comprised of a first and a second fabric side having indicia of a face on the exterior of the first fabric side. The first and the second fabric side are held together in attachment by stitching along the periphery of the fabric sides so as to form a pocket. The opening of the pocket allows for the filling of the pocket with a bean or pellet material. The two sides of the fabric left unattached are then brought into engagement and attached by stitching the sides closed. A hook and loop fastener such as those sold under the trademark Velcro or snaps are provided on both sides of the feet and hands of the alphanumeric figures so that they may be brought into removable engagement with each other and removably secured hand to hand, foot to foot, or foot to hand. A cloth or material hook is provided on each of the figures at a point of attachment generally opposite the legs attached to the body of the figure.

Additionally, in one embodiment, a mechanical sound producing device may be sew into the interior of the pocket which, upon activation by depression, produces a voice which says the name of the letter or number into which the mechanical sound producing device has been inserted. In yet a further embodiment, the mechanical sound producing device may, in addition to saying the name of the letter or numeral into which it has been inserted, say a word or name. For example, if a group of alphanumeric figures are grouped together to form the word "toy", each individual alphanumeric figure would have a mechanical sound producing device which said the individual letter in which the device had been inserted along with the entire word "toy".

Furthermore, in one embodiment, a flexible rollable board having a Velcro™ material or snaps along a front of the board, may be utilized by attaching the individual figures to the Velcro™ or snaps of the board to the Velcro™ or snaps of the hands and feet of the figures.

BRIEF DESCRIPTION OF DRAWINGS

Other objects and advantages of the invention will become apparent upon reading the following detailed description of several embodiments of our invention and upon reference to the drawings, in which FIG. 1 is a perspective view of the alphanumeric figures representing letters of the English Alphabet connected hand to hand and foot to foot.

FIG. 2 is a perspective view of the alphanumeric figures representing Roman numerals connected hand to hand and foot to foot.

FIG. 3 is a perspective view of a board showing the hanging attachment of three alphanumeric figures thereon.

FIG. 4A and 4B are front views of a complete set of alphanumeric figures showing the English alphabet from A to Z.

FIG. 5 is a front view of Roman numerals from 0 to 9.

FIG. 6 is a front view of one of the alphanumeric figures showing a cut-away view of the mechanical sound producing device.

DETAILED DESCRIPTION OF INVENTION

Figure 4B:
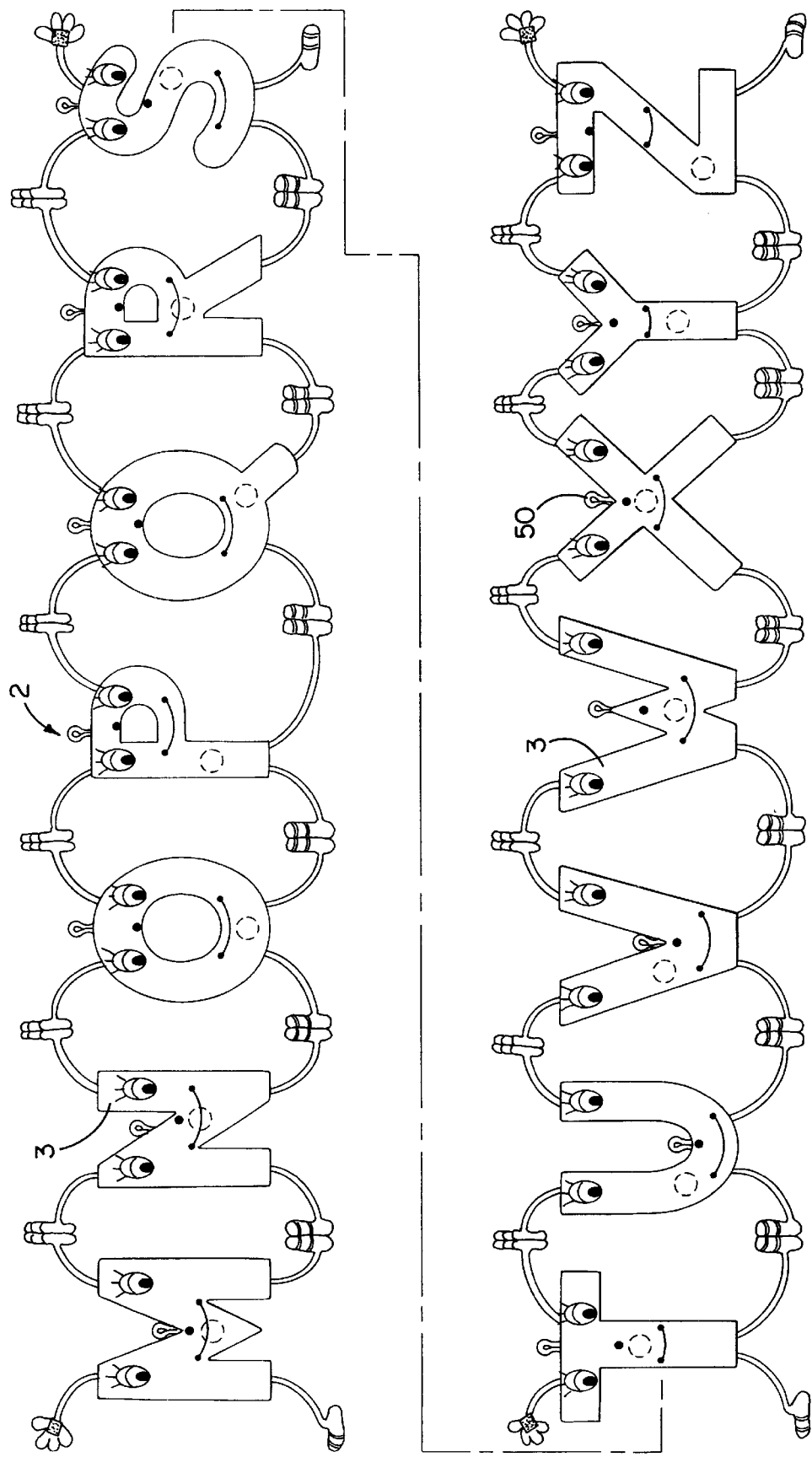
Figure 7:
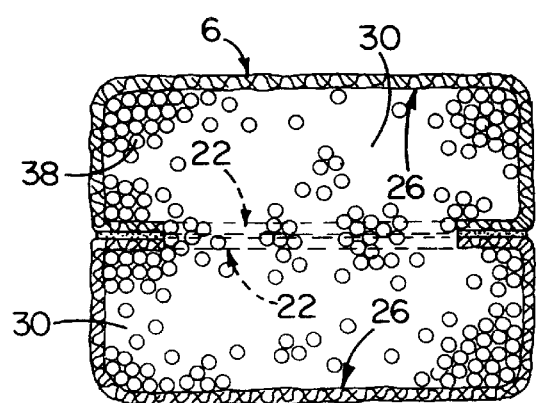
FIG. 7 is a cross section along line 7—7 of FIG. 6 showing the filing material and attachment mechanism of one of the alphanumeric figures.

As shown in FIGS. 4A and 4B, the present invention comprises a plurality of alphanumeric FIGS. 2 having a body member 3 in the general shape of each character of the English Alphabet from A to Z and each Roman numeral from 0 to 9 as shown in FIG. 5. These Figures may take different shapes and forms such as doll like human figures or animals. As Shown in FIG. 1, an alphanumeric FIG. 2 is comprised of a first fabric side 4 and a second fabric side 6. In one embodiment, the first fabric side 4 and second fabric side 6 may be constructed of a washable fire-retardant cotton material. As shown in FIG. 7, the first fabric side 4 and the second fabric side 6 have an interior fabric wall 22 and an exterior fabric wall 26. As shown in FIG. 6, the first fabric side 4 has indicia 32 of a face located on the exterior fabric wall 26.

As shown in FIG. 7, the interior fabric walls 22,22 of the first fabric side 4 and the second 6 fabric sides are brought into alignment with each other. The first fabric side 4 and the second fabric side 6 are then secured together by stitching them together along their outermost periphery thereby forming a pocket 30. The opening in the pocket 30 is generally of a size to facilitate the filling of the pocket 30 with a filling material 38. In one embodiment, the filling material 38 may consist of dried beans or plastic pellets or other suitable material. Once the pocket 30 has been filled to a desired amount, the pocket 30 is securely closed by continued stitching along the outermost periphery of the first fabric side 4 and the second fabric side 6.

Figure 8:
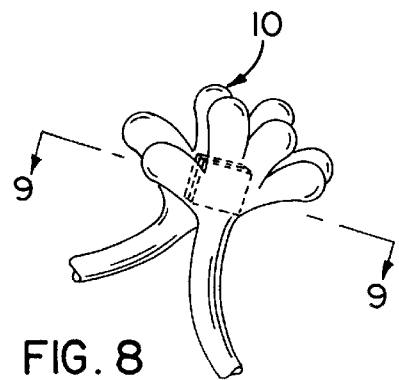
FIG. 8 is an expanded view of the hands of one of the alphanumeric figures in engagement using Velcro™.
Figure 9:
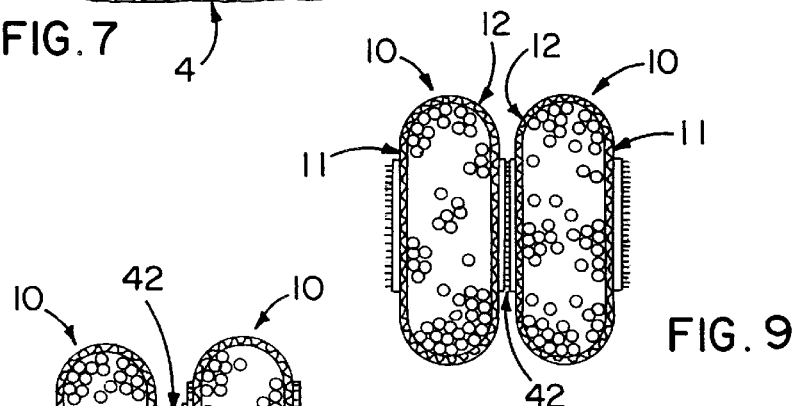
FIG. 9 is an expanded view along line 9—9 of FIG. 8 showing attachment material as Velcro™.
Figure 11:
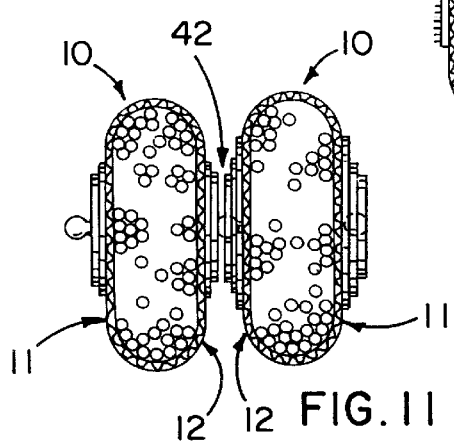
FIG. 11 is an expanded view along line 11—11 of FIG. 10 showing the attachment material as snaps.
Figure 10:
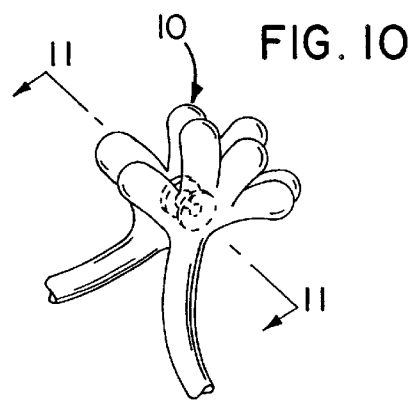
FIG. 10 is an expanded view of the hands of one of the alphanumeric figures in engagement using snaps.

As shown in FIGS. 1–2, a pair of arms 8,8 having a proximal end 7 and a distal end 9 are attached by stitching the proximal end 7 to the exterior of the exterior fabric wall 26. At the distal end 9 of each arm 8,8 is attached a hand 10 having a front side 11 and a back side 12. As shown in FIGS. 8 and 10, the front side 11 and the back side 12 of each hand 10,10 is provided with an attachment material 42. As shown in FIGS. 8 and 9, in one embodiment, the attachment material 42 is a Velcro™ material and in another embodiment, the attachment material 42 is snaps, as shown in FIGS. 10 and 11. A drawstring bag (not shown) can be used to carry the alphanumeric figures.

Opposite the pair of arms 8,8, as shown in FIGS. 1 and 2, is attached a pair of legs 14,14 having a distal end 15 and a proximate end 16. The legs are attached at the distal end 15 to the exterior of the exterior fabric wall 26. At the proximate end 16 of each leg 14,14 is located a foot 18,18 having a front side 19 and a back side 20. The front side 19 and the back side 20 of each foot 18,18 is provided with an attachment material 42 in a manner similar to that of the arms, 8,8 shown in FIGS. 8–11.

As shown in FIGS. 1, 2, 4A and 4B, in one embodiment, a hook 50 is provided opposite the legs 14,14 for hanging the alphanumeric FIG. 2 and is attached to the body member 3.

Figure 12:
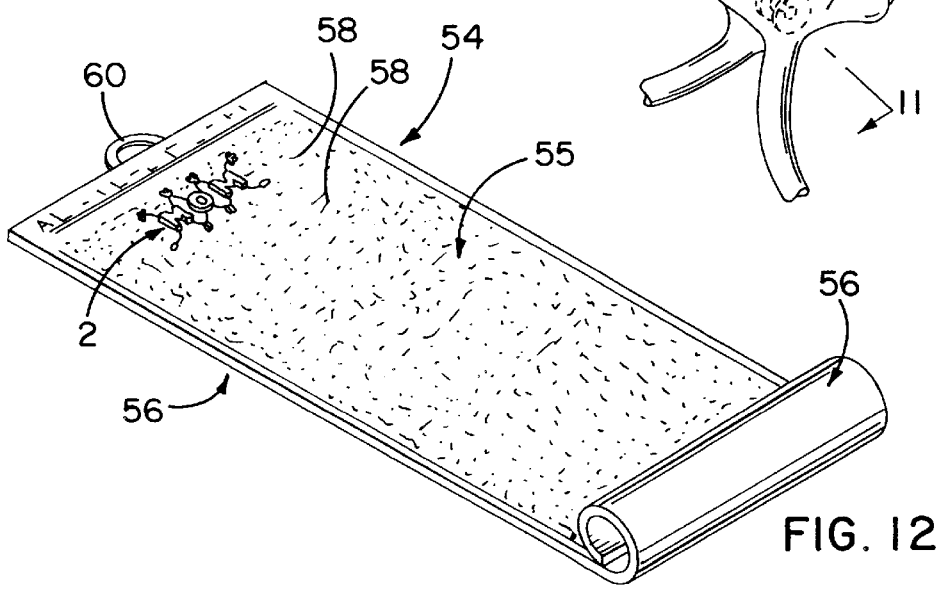
FIG. 12 is a perspective view of the rollable flexible board showing attachment of three alphanumeric figures thereon an attachment material as Velcro™.

As shown in FIG. 12, in one embodiment, a flexible rollable portable attachment board or sheet 54 having a primary side 55 and a secondary side 56 is provided with attachment material 58 located on either or both of the primary side 55, and the secondary side 56. The board or sheet 54 is provided with a plurality of hooks 60 about its periphery so that it may be hung exposing the attachment material 58.

As shown in FIG. 3, in another embodiment, a rigid attachment board 62 or sheet having a primary side 64 and a secondary side 66 is provided with attachment material 68 located on either or both of the primary side 64 and the secondary side 66. The board is provided with a plurality of hooks 70 about its periphery so that it may be hung exposing the attachment material 68.

As shown in FIG. 6, in another embodiment, a mechanical sound producing device 72 is optionally attached to the interior fabric wall 22 of the pocket 30 which, upon activation by depression, produces a voice which says the name of the alphanumeric FIG. 2 into which the mechanical sound producing device 72 has been inserted. The mechanical sound producing device 72 may be sewn or attached by an adhesive to the interior of the fabric wall 22. In yet a further embodiment, the mechanical sound producing device 72 may, in addition to saying the name of the alphanumeric FIG. 2 into which it has been inserted, say a word, a name, or a phrase. For example, if a group of alphanumeric FIGS. 2 are grouped together to form the word "toy", each individual alphanumeric FIG. 2 would have a mechanical sound producing device 72 which said the individual letter in which the device had been inserted along with the entire word "toy". After the letter Z is pronounced by the mechanical sound producing device 72, it can be additionally programmed to emit a phrase or song. For example, after saying the letter Z, the mechanical sound producing device 72 would say, "Now I know my ABC's, next time won't you sing with me".

Figure 13:
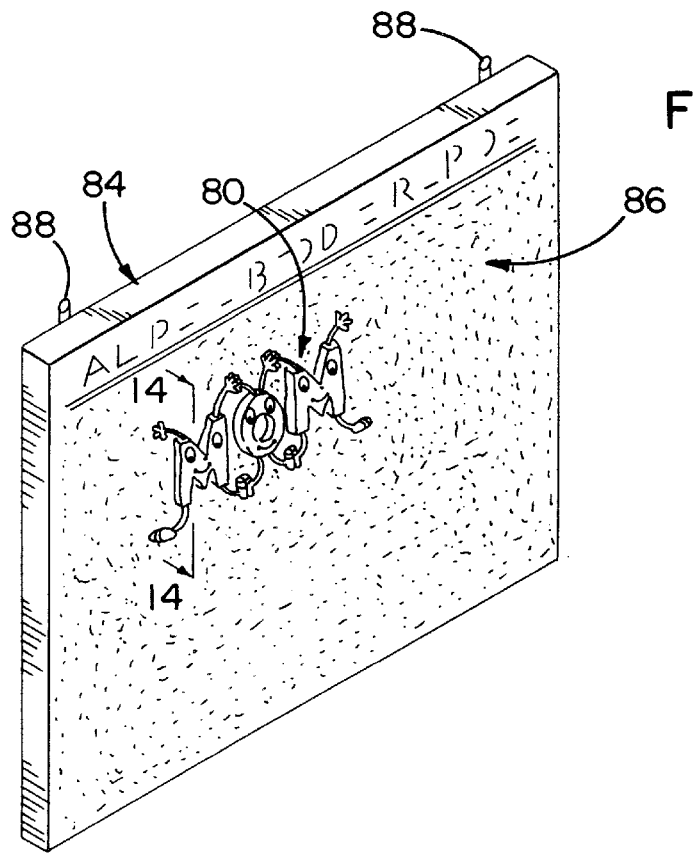
FIG. 13 is a perspective view of a board showing attachment of three alphanumeric figures thereon using an attachment material as Velcro™.
Figure 14:
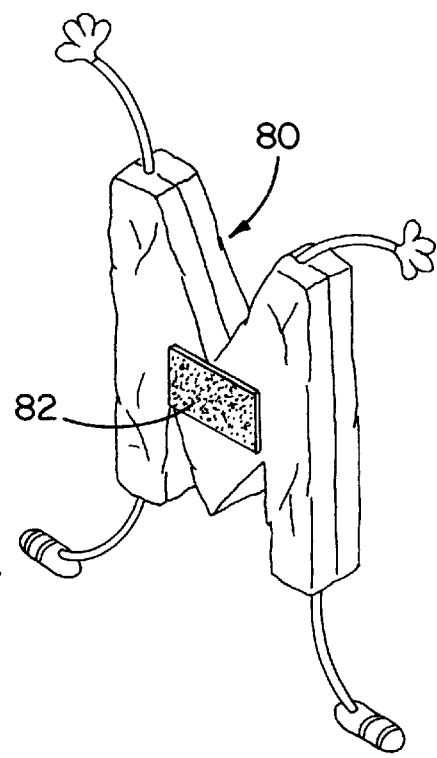
FIG. 14 is another enlarged perspective view of one of the letters shown on FIG. 13 as taken on the line 14—14 of FIG. 13.
Figure 15:
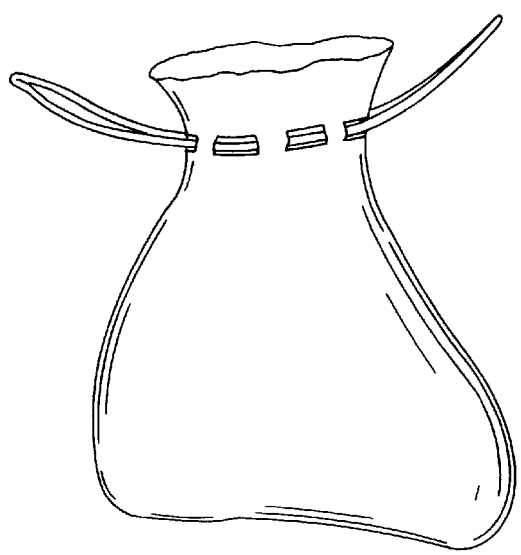
FIG. 15 is a perspective view of the drawstring bag used to carry the alphanumeric figures.

In FIGS. 13 and 14, we have shown a different embodiment of our invention. In FIG. 13, it will be seen that we have used alphanumeric FIGS. 80 spelling the word "MOM" which are secured on backsides of each alphanumeric FIG. 80 by attachment material 82 (see FIG. 14) which is comprised of a material such as that sold under the trade name "VelcroTm™". To co-act with the alphanumeric FIGS. 80, we have also provided a board 84 having an attachment material 86 which co-acts with the attachment material 82 on the alphanumeric FIG. 80 thereby to removably secure the alphanumeric FIG. 80 to the board 84. The alphanumeric FIGS. 80 are otherwise the same as those previously described and identified as alphanumeric FIG. 2. In summary, FIGS. 13 and 14 show an embodiment of our alphanumeric FIGS. 2 which can be attached to the board 84 without requiring attachment means 68 of the type shown in FIG. 3 and this is our preferred embodiment for mounting the figures onto a wall hanging member such as the board 84.

In operation, the alphanumeric FIGS. 2 are removably coupled together by bringing into contact the attachment material 42 located on either the hands 10 or the feet 18 of the figures with either the hands 10 or the feet or another alphanumeric FIG. 2, the same alphanumeric FIG. 2,2 or the attachment board 54. The alphanumeric FIG. 2 may be brought together and removably coupled by using the attachment material 42 so as to form words or strings of numbers. The alphanumeric FIGS. 2 may also be coupled via the attachment material 42 so as to correctly display the English alphabet in order from A to Z of the Roman numerals in order from 0 to 9. The board 62, 54, and 84 have hanger brackets 70,70, 60, and 88 for hanging the board on a supporting wall surface and the like.

Although the invention has been described by reference to some embodiments, it is not intended that the novel device be limited thereby, but that modifications thereof are intended to be included as falling within the broad scope and spirit of the foregoing disclosure, the following claims and the appended drawings.

We claim:

1. An alphabetic set of teaching figures comprising:

a stuffed body member on each figure;

a pair of arms on each figure having a proximal end and a distal end, each arm being attached to the body member by an attachment mechanism at their proximal ends;

a pair of hands on each figure having a front side and a back side attached to the distal end of each respective arm by the attachment mechanism; and an attachment material attached by the attachment mechanism to the front side and the back sides of each hand thereby allowing each figure to be removably attached to another figure or the same figure thus providing a line of figures connected together.

2. The alphabetic set of teaching figures of claim 21, further comprising the attachment material secured to an exterior fabric wall for display purposes or for hanging each figure so as to create a word, a phrase, or numbers.

3. The alphabetic set of teaching figures of claim 2, further comprising a flexible rollable portable attachment board having a primary side and a secondary side; the primary side of the flexible rollable portable attachment board having the attachment material applied thereupon enabling the alphabetic set of teaching figures to be attached thereto so a user can create words, phrases, or numbers from the alphabetic set of teaching figures.

4. The alphabetic set of teaching figures of claim 2, further comprising a rigid attachment board having a primary side and a secondary side, the primary side of the rigid attachment board having the attachment material applied thereupon enabling the alphabetic set of teaching figures to be attached thereto so a user can create words, phrases, or numbers from the alphabetic set of teaching figures.

5. The alphabetic set of teaching figures of claim 2, further comprising the body member on each figure having a first fabric side and a second fabric side forming a pocket therebetween filled with a filling material, the first fabric side and the second fabric side each having an interior fabric wall and an exterior fabric wall, and a mechanical sound producing device attached to the body member for audible pronunciation of a word, a name, or a phrase, the body member further comprising an indicia of a face attached to the exterior wall of the first fabric side.

6. The alphabetic set of teaching figures of claim 1, wherein a pair of legs is provided on each figure having a distal end and a proximal end, the legs attached to the body member by the attachment mechanism at their proximal ends.

7. The alphabetic set of teaching figures of claim 2, wherein the attachment material is hook and loop, or snaps, and the filling material is a granular filling material.

8. An alphanumeric teaching figure comprising:
   a body member having a first fabric side and a second fabric side forming a pocket therebetween filled with a filling material, the first fabric side and the second fabric side each having an interior fabric wall and an exterior fabric wall;
   a pair of arms having a proximal end and a distal end, the arms attached to the body by an attachment mechanism at their proximal ends;
   a pair of legs having a distal end and a proximal end, the legs attached to the body member by the attachment mechanism at their proximal ends;
   a pair of hands having a front side and a back side attached to the distal end of each respective arm by the attachment mechanism;
   a pair of feet having a front side and a back side attached to the distal end of each respective leg by the attachment mechanism; and
   an attachment material attached by the attachment mechanism to the front side and the back side of each hand and foot thereby allowing each alphanumeric teaching figure to be removably attached to another alphanumeric teaching figure or the same alphanumeric teaching figure in a grouped relationship enabling the alphanumeric teaching figure to be maintained in a side-by-side (horizontal) relationship to an adjacent alphanumeric teaching figure, the alphanumeric teaching figure to be maintained in a top-to-bottom (vertical) aligned relationship to an adjacent alphanumeric teaching figure, and the alphanumeric teaching figure to be maintained in a diagonally aligned relationship to an adjacent alphanumeric teaching figure.

9. The alphanumeric teaching figure of claim 1, wherein the filling material is beans.

10. The alphanumeric teaching figure of claim 1, wherein the filling material is pellets.

11. The alphanumeric teaching figure of claim 1, wherein the attachment mechanism comprises stitching.

12. The alphanumeric teaching figure of claim 1, wherein the attachment mechanism comprises an adhesive.

13. The alphanumeric teaching figure of claim 1, wherein the attachment material is hook and loop.

14. The alphanumeric teaching figure of claim 1, wherein the attachment material comprises snaps.

15. The alphanumeric teaching figure of claim 1, wherein the body further comprises an indicia of a face attached to the exterior wall of the first fabric side.

16. The alphanumeric teaching figure of claim 1, wherein the body further comprises an indicia of clothing attached to the exterior fabric wall of the first fabric side.

17. The alphanumeric teaching figure of claim 1, further comprising a drawstring bag for carrying the alphanumeric figures.

18. The alphanumeric teaching figure of claim 1, further comprising attachment material secured to the exterior fabric wall of the second fabric side for display purposes or for hanging the alphanumeric figure.

19. The alphanumeric teaching figure of claim 1, further comprising a flexible rollable portable attachment board having a primary side and a secondary side, the flexible rollable portable attachment board having the attachment material applied on the primary side, the secondary side, or both.

20. The alphanumeric teaching figure of claim 1, further comprising a rigid attachment board having a primary side and a secondary side, the rigid attachment board having attachment material applied on the primary side, the secondary side, or both.

21. The alphanumeric teaching figure of claim 1, further comprising a mechanical sound producing device attached to the interior fabric wall for audible pronunciation of a word, a name, or a phrase.

22. An alphabetic set of teaching figures comprising:
   a body member on each figure having a first fabric side and a second fabric side forming a pocket therebetween filled with a filling material, the first fabric side and the second fabric side each having an interior fabric wall and an exterior fabric wall;
   a pair of arms on each figure having a proximal end and a distal end, each arm being attached to the body member by an attachment mechanism at their proximal ends;
   a pair of legs on each figure having a distal end and a proximal end, the legs attached to the body member by the attachment mechanism at their proximal ends;
   a pair of hands on each figure having a front side and a back side attached to the distal end of each respective arm by the attachment mechanism;
   a pair of feet on each figure having a front side and a back side attached to the distal end of each respective leg by the attachment mechanism; and
   an attachment material attached by the attachment mechanism to the front side and the back sides of each hand and foot thereby allowing each figure to be removably attached to another figure or the same figure thus providing a line of figures connected together, the attachment material enabling side-by-side top-to-bottom and diagonal configurations of the line of figures.

23. The alphabetic set of teaching figures of claim 22, further comprising the attachment material secured to the exterior fabric wall of the second fabric side for display purposes or for hanging each figure so as to create a word, a phrase, or numbers.

24. The alphabetic set of teaching figures of claim 23, further comprising a flexible rollable portable attachment board having a primary side and a secondary side; the primary side of the flexible rollable portable attachment board having the attachment material applied thereupon enabling the alphabetic set of teaching figures to be attached thereto so a user can create words, phrases, or numbers from the alphabetic set of teaching figures.

25. The alphabetic set of teaching figures of claim 23, further comprising a rigid attachment board having a primary side and a secondary side, the primary side of the rigid attachment board having the attachment material applied thereupon enabling the alphabetic set of teaching figures to be attached thereto so a user can create words, phrases, or numbers from the alphabetic set of teaching figures.

26. The alphabetic set of teaching figures of claim 23, wherein the attachment material is hook and loop adhesive, or snaps, and the filling material is a grandler filling material.

27. The alphabetic set of teaching figures of claim 23, further comprising a mechanical sound producing device attached to the interior fabric wall for audible pronunciation of a word, a name, or a phrase, the body member further comprising an indicia of a face attached to the exterior wall of the first fabric side.

* * * * *